United States Patent [19]
Sakuyama et al.

[11] Patent Number: 6,137,595
[45] Date of Patent: Oct. 24, 2000

[54] COLOR CONVERSION PROCESSING METHOD FOR COLOR MATCHING AND A PROCESSOR READABLE MEDIUM STORING A PROGRAM FOR IMPLEMENTING THE COLOR CONVERSION PROCESSING METHOD

[75] Inventors: Hiroyuki Sakuyama, Tokyo; Hisao Shirasawa, Kanagawa, both of Japan

[73] Assignee: Ricoh Company, Ltd., Tokyo, Japan

[21] Appl. No.: 09/060,850

[22] Filed: Apr. 16, 1998

[30] Foreign Application Priority Data

Apr. 17, 1997 [JP] Japan ................................. 9-100672

[51] Int. Cl.⁷ .............................. G03F 3/08; G06K 9/00; B41B 15/00; B41J 15/00; G06F 15/00
[52] U.S. Cl. ........................... 358/1.9; 358/518; 382/167
[58] Field of Search ........................ 395/109; 358/502, 358/504, 518, 520; 382/162, 167

[56] References Cited

U.S. PATENT DOCUMENTS

| | | | |
|---|---|---|---|
| 5,704,021 | 12/1997 | Smith et al. | 395/109 |
| 5,872,895 | 2/1999 | Zandee et al. | 395/109 |
| 5,878,195 | 3/1999 | Mahy | 395/109 |
| 5,881,211 | 3/1999 | Matsumura | 395/109 |

FOREIGN PATENT DOCUMENTS

| | | |
|---|---|---|
| 7-107312 | 4/1995 | Japan . |
| 7-236066 | 9/1995 | Japan . |
| 7-236067 | 9/1995 | Japan . |

*Primary Examiner*—Kimberly A. Williams
*Attorney, Agent, or Firm*—Oblon, Spivak, McClelland, Maier & Neustadt, P.C.

[57] ABSTRACT

A color conversion processing method which can apply an optimum color matching process to each color by selecting an appropriate color matching process for each color. Color image information includes at least one drawing object to be drawn by a color image outputting apparatus so as to output the color image information after conversion to the color image outputting apparatus. It is determined whether each color of the drawing object in the input color image information is a previously designated specific color. A previously designated color matching process is applied to the color of the drawing object only when the color of the drawing object is the specific color so that the color determined to be the specific color is not subjected to the color matching process.

38 Claims, 15 Drawing Sheets

COLOR CONVERSION PROCESSING METHOD FOR COLOR MATCHING AND A PROCESSOR READABLE MEDIUM STORING A PROGRAM FOR IMPLEMENTING THE COLOR CONVERSION PROCESSING METHOD

BACKGROUND OF THE INVENTION

1. Field of the Invention

The present invention generally relates to a color conversion processing method for color matching and, more particularly, to a color conversion processing method for applying an appropriate color matching process to each color in a bit map image, a character image or a graphic image. The present invention also relates to a computer readable medium storing programs which cause a computer such as a general-purpose computer to perform the above-mentioned color conversion processing method.

2. Description of the Related Art

Presently, a color matching system which uses device independent colors is studied so as to provide color image data to a color printer, the color image data accurately representing a color image displayed on a color display monitor. The purpose of provision of such a color matching system is to obtain the same color image from different devices. Generally, a signal matching a visual sense of a human being such as the CIE 1931 XYZ or the L*a*b* signal is used as a color signal which is independent for each device.

However, a color representation, which is preferable to a human being, differs according to types of images such as a natural color image (photographic image), a character image or an illustration image. Accordingly, in order to obtain color image information which includes various types of images, an architecture which can switch a color processing according to a document structure included in a color image is required.

Japanese Laid-Open Patent Application No. 7-107312 discloses a color information processing method and apparatus which is related to a technique for changing a color processing in accordance with a document structure included in the color image. In the method and apparatus of this patent document, attribute information of a color matching which is appropriate for various types of images is set by application software, and a driver or a color matching processing unit in a printer performs a suitable color matching process in accordance with the attribute information.

However, in the color image outputting system disclosed in the above-mentioned patent document, there is a problem in that a matching error of a specific color cannot be prevented. The matching error refers to a phenomenon that, for example, a pure black character cannot be represented in true black in a case in which a document image includes only character images, which are in a plurality of colors, and the same color matching is applied to each of the colors. This is because, in a color image outputting apparatus such as a laser printer or an inkjet printer, a black image is formed by using a black colorant and a plurality of other colorants superimposed on the black image, and an offset of each color with respect to other colors is conspicuous. Thus, a desired pure black cannot be obtained when a color matching is applied to a line image such as a character image or a rule image when a color printer such as a laser printer or an inkjet printer is used. In order to eliminate such a problem, it is suggested that a color matching process not be applied to a specific color which tends to generate the matching error or a specific color to which a viewer is sensitive to the matching error. Alternatively, a special color matching process may be applied to such a specific color. Additionally, it is suggested that a color matching process provide a function to form a black image by a black colorant alone.

Additionally, it is difficult to develop a color matching process which can achieve an optimum condition for each color. That is, it is difficult to develop a device profile or a color conversion engine which can achieve an optimum condition for each color. Accordingly, there is a problem in that an accuracy of a color matching process varies for each color.

Further, on the output side such as a color printer, a plurality of colorants (for example, ink or toner in cyan, magenta, yellow or black) must be provided in a color image outputting apparatus, each of the colorants being a color component, and the number of colors to be provided in the color image outputting apparatus is increasing. Since the color represented by the colorants for these color components (primary colors) is controlled to be optimum, it is possible to eliminate a color matching process. That is, it is better to output a color image in the primary colors without color matching. Especially, when the color image outputting apparatus has the yellow colorant, a yellow colorant image directly output without color matching may be presented to a viewer as a clear color image.

SUMMARY OF THE INVENTION

It is a general object of the present invention to provide an improved and useful color conversion method in which the above-mentioned problems are eliminated.

A more specific object of the present invention is to provide a color conversion processing method which can apply an optimum color matching process to each color by selecting an appropriate color matching process for each color.

In order to achieve the above-mentioned object, there is provided according to one aspect of the present invention a color conversion processing method for converting color image information including at least one drawing object to be drawn by a color image outputting apparatus so as to output the color image information after conversion to the color image outputting apparatus, the color conversion processing method comprising the steps of:

inputting the color image information;

determining whether each color of the drawing object in the input color image information is a previously designated specific color; and applying a previously designated color matching process to the color of the drawing object only when the color of the drawing object is the specific color so that the color determined to be the specific color is not subjected to the color matching process.

According to the above-mentioned invention, a color matching error can be positively eliminated, and an optimum color matching process can be selected for each color of the drawing object.

In this invention, the determination of the determining step may be performed for each type of the drawing object. Additionally, the specific color may be previously designated for each type of the drawing object.

Additionally, there is provided according to another aspect of the present invention a color conversion processing method for converting color image information including at least one drawing object to be drawn by a color image outputting apparatus so as to output the color image information after conversion to the color image outputting apparatus, the color conversion processing method comprising the steps of:

inputting the color image information;

determining whether each color of the drawing object in the input color image information is a previously designated specific color;

applying a previously designated color matching process to the color of the drawing object when the color of the drawing object is the specific color; and applying a color matching process other than the previously designated color matching process to the color of the drawing object when the color of the drawing object is not the specific color.

According to the above-mentioned invention, a color matching error can be positively eliminated, and an optimum color matching process can be selected for each color of the drawing object.

In this invention, the determination of the determining step may be performed for each type of the drawing object. Additionally, the specific color may be previously designated for each type of the drawing object. Further, a different color matching process may be designated for each type of the drawing object.

The color conversion processing method according to the present invention may further comprise the step of:

determining whether the drawing object in the color image information is a character image so that the determining step for color is performed only when the drawing object is the character image.

Accordingly, application of the color matching process appropriate for the specific color is limited to the character image which does not includes a color gradation. Thus, a matching error in the color gradation can be eliminated, resulting in prevention of discontinuity in the color gradation.

In one embodiment of the present invention, the color image outputting apparatus may be a color printer, and the specific color may be one of colors of colorants used in the color printer. Additionally, the specific color may be selected from a group consisting of cyan, magenta, yellow, black, red, green, blue and white.

The color conversion processing method according to the present invention may further comprise the step of:

designating an arbitrary color as the specific color in accordance with previously provided information.

Accordingly, a user can designate a desired color as the specific color, and thus the user's preference can be reflected in a color image output from the color image outputting apparatus.

Additionally, the designating step may include the step of designating an arbitrary color matching process as the color matching process in accordance with previously provided information.

Accordingly, the user can select a desired color matching process for each color in the drawing object.

Further, the designating step may include the step of designating an arbitrary color matching process for each drawing object included in the color image information.

Accordingly, the user can select a desired color matching process for each drawing object included in the color image information.

Other objects, features and advantages of the present invention will become more apparent from the following detailed description when read in conjunction with the accompanying drawings.

DETAILED DESCRIPTION OF THE PREFERRED EMBODIMENTS

First Embodiment

Figure 1:
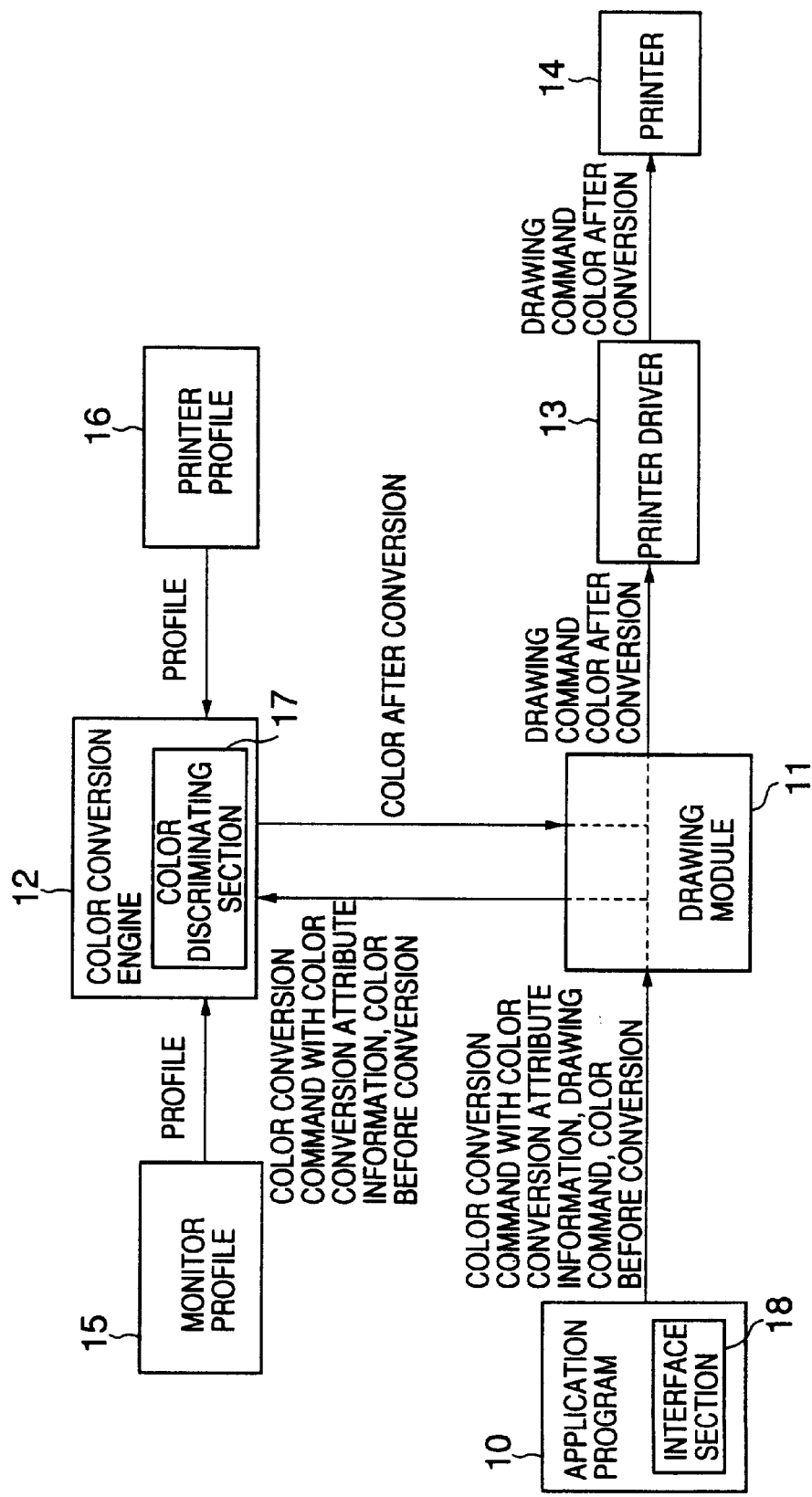
FIG. 1 is a block diagram of a color conversion processing system according to a first embodiment of the present invention.

A description will now be given of a first embodiment of the present invention. FIG. 1 is a block diagram of a color conversion processing system according to the first embodiment of the present invention.

As shown in FIG. 1, the color conversion processing system according to the first embodiment of the present invention comprises an application program 10, a drawing module 11, a color conversion engine 12, a printer driver 13 and a printer 14.

Figure 2:
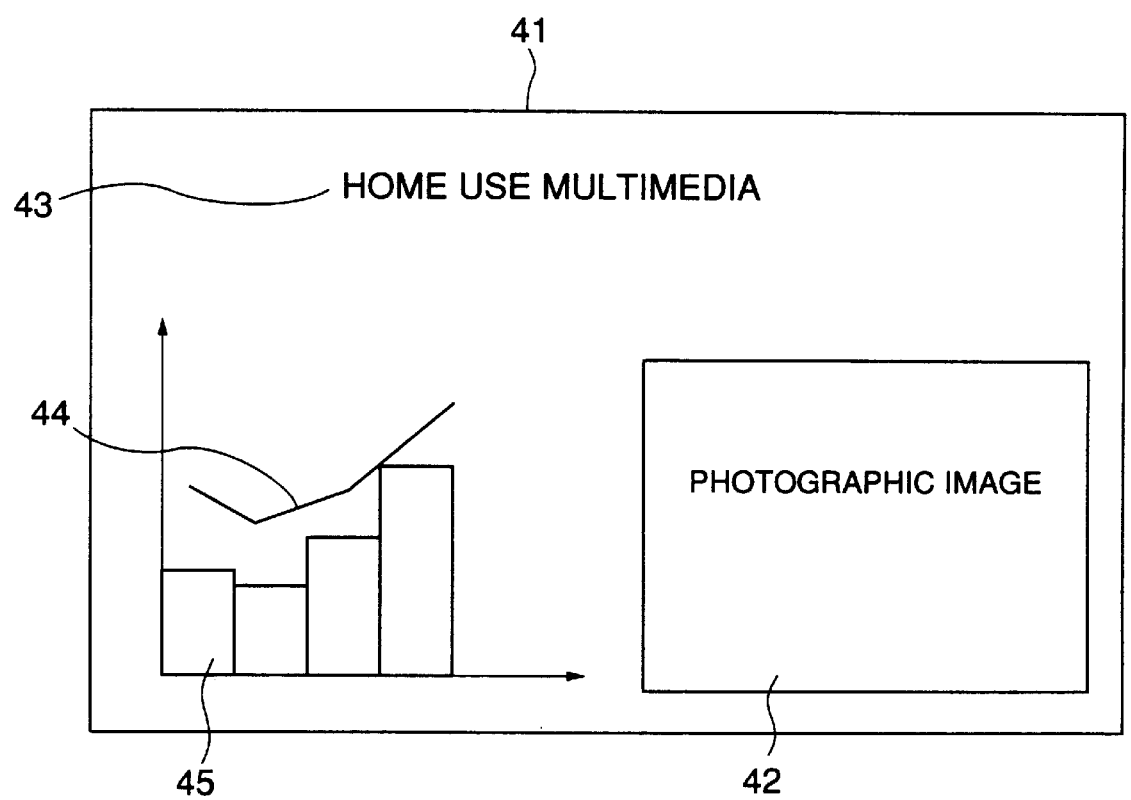
FIG. 2 is an illustration for explaining a color image including a bit map image, a character image and a graphic image.

The application program 10 is capable of producing color image information of objects to be drawn. The object described in this specification refers to an image which is one of a bit map image, a character image and a graphic image. FIG. 2 shows an entire color image including objects corresponding to the bit map image, the character image and the graphic image. In FIG. 2, the color image 41 includes a color photograph 42 which correspond to a bit map image, characters 43 which corresponds to a character image, graphs 44 and 45 which correspond to a graphic image or a line image. The application program 10 is compatible with (or capable of handling) a color matching system. That is, color conversion attribute information, such as information with respect to contrast maintaining type, a brightness maintaining type or a chroma maintaining type, can be set for each object to be drawn. Hereinafter, the object to be drawn may be referred to as a drawing object. Accordingly, when the application program 10 is compatible with a color matching system, the application program can output a drawing command (print command) and a color conversion command. The color conversion command is attached with drawing color information which designates a color of the drawing object. The color conversion command is also attached with the above-mentioned color conversion attribute information for applying a color matching process to the drawing color information. It should be noted that a setting of the color conversion attribute information can be performed by a user through an interface section of the application program 10.

The drawing module 11 is provided in an operating system. The drawing module 11 controls a drawing process for a color image outputting apparatus such as a monitor display or a printer. The drawing module 11 receives the above-mentioned drawing command, drawing color information, color conversion attribute information and color conversion command from the application program 10, and outputs the drawing color information, the color conversion attribute information and the color conversion command to the color conversion engine 12 so as to perform the color matching process.

The color conversion engine 12 is provided in the operating system. The color conversion engine 12 receives a monitor profile 15 and a printer profile 16. The color conversion engine 12 also receives color image information of an image being displayed on a display monitor (not shown in the figure) so as to apply a color matching process to the color image information so that the color image information matches a color representation characteristic of the printer 14. In the present embodiment, the color conversion attribute information can be set for each drawing object in the color image information by the application program 10. Thus, the color conversion engine 12 can perform the color matching process by using different color matching process for each drawing object based on the color conversion attribute information.

Additionally, the color conversion engine 12 of the present invention includes a color discriminating section 17. The color discriminating section 17 holds color information with respect to a previously designated specific color (hereinafter referred to as specific color) so as to determine whether or not a color of each drawing object is the specific color. As mentioned above, if the color matching process is applied to a special color, a matching error may be generated. Thus, the special color is designated as the specific color so that the color discriminating section 17 can determine whether the color of each drawing object is the specific color. When the color of a drawing object is the specific color, the color matching process is not applied to the drawing object in the color conversion engine 12.

The color discriminating section 17 holds the following colors as the specific color. First colors to be designated as the specific color are the original colors of the colorants provided in the printer 14. With respect to the original colors (primary colors), since color representation of the colorants is optimized, it is preferred to output each original color without being subjected to the color matching process even if a matching error is generated between each original color output from the printer 14 and the corresponding original color displayed on the display monitor.

Second colors to be designated as the specific color are cyan, magenta, yellow, black, red, green, blue and white. The second colors include maximum concentration and low concentration of these colors. The above-listed colors are original colors and colors conforming to the original colors, and provide a relatively large color matching error. Thus, these colors are preferred to be designated as the specific color.

The printer driver 13 receives the drawing color information which has been subjected to the color matching process and the drawing command. The printer driver 13 converts the drawing command into a drawing command peculiar to the printer 14, and outputs the converted drawing command to the printer 14 together with the drawing color information. Any type of color image outputting apparatus such as a laser printer or an inkjet printer can be used as the printer 14 as long as a printing operation can be performed based on the color image information.

Figure 3:
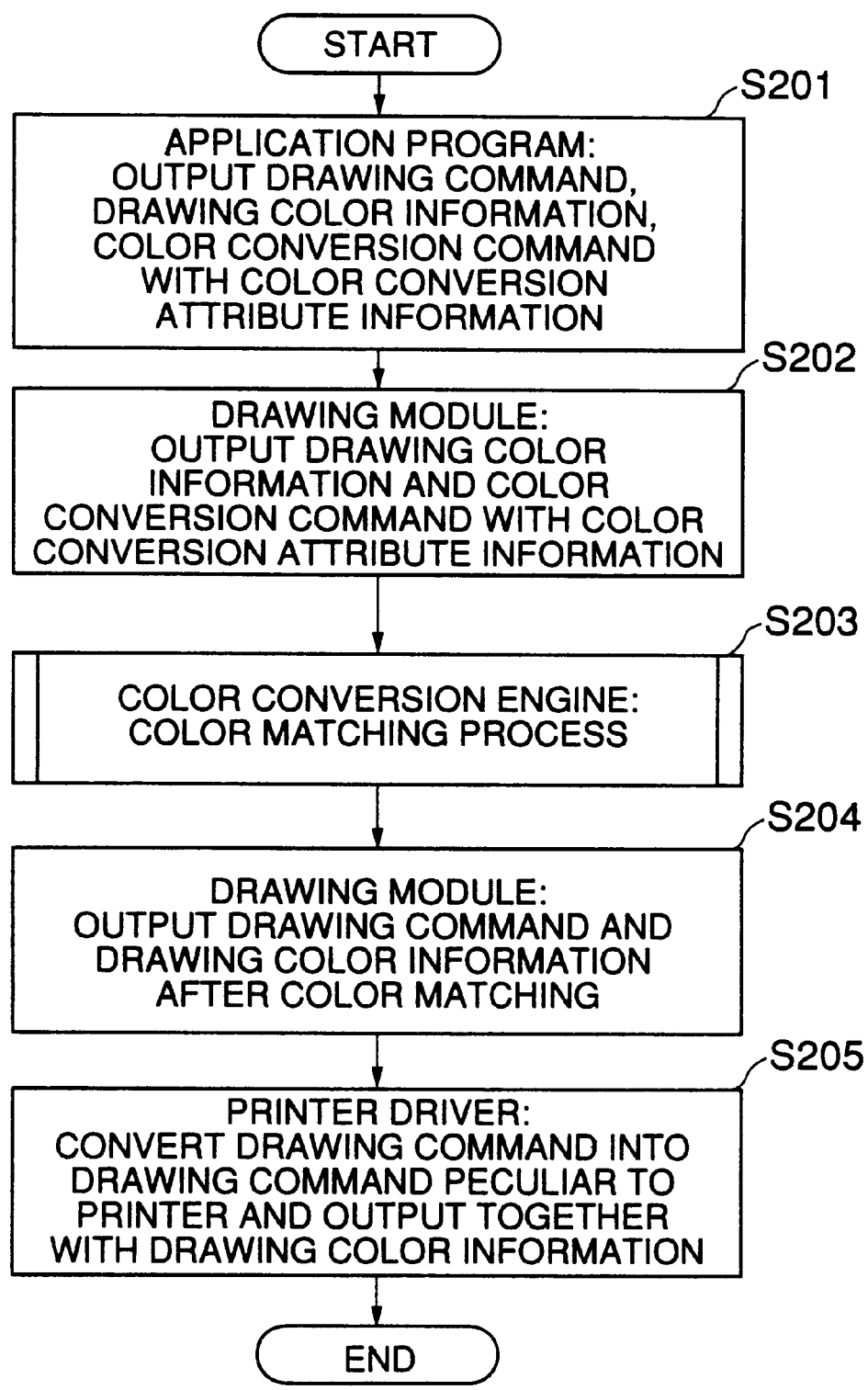
FIG. 3 is a flowchart of a color conversion processing method performed by the color conversion processing system shown in FIG. 1.

A description will now be given, with respect to FIG. 3, of a color conversion processing method according to the first embodiment of the present invention. FIG. 3 is a flowchart of an entire process according to the color conversion processing method.

When the process according to the color conversion processing method is started, in step S201, the drawing module 11 receives from the application program 10 the drawing command, the drawing color information and the color conversion command including the color conversion attribute information.

Then, in step S202, the drawing module 11 outputs to the color conversion engine 12 the drawing color information and the color conversion command including the color conversion attribute information for each drawing object.

Figure 4:
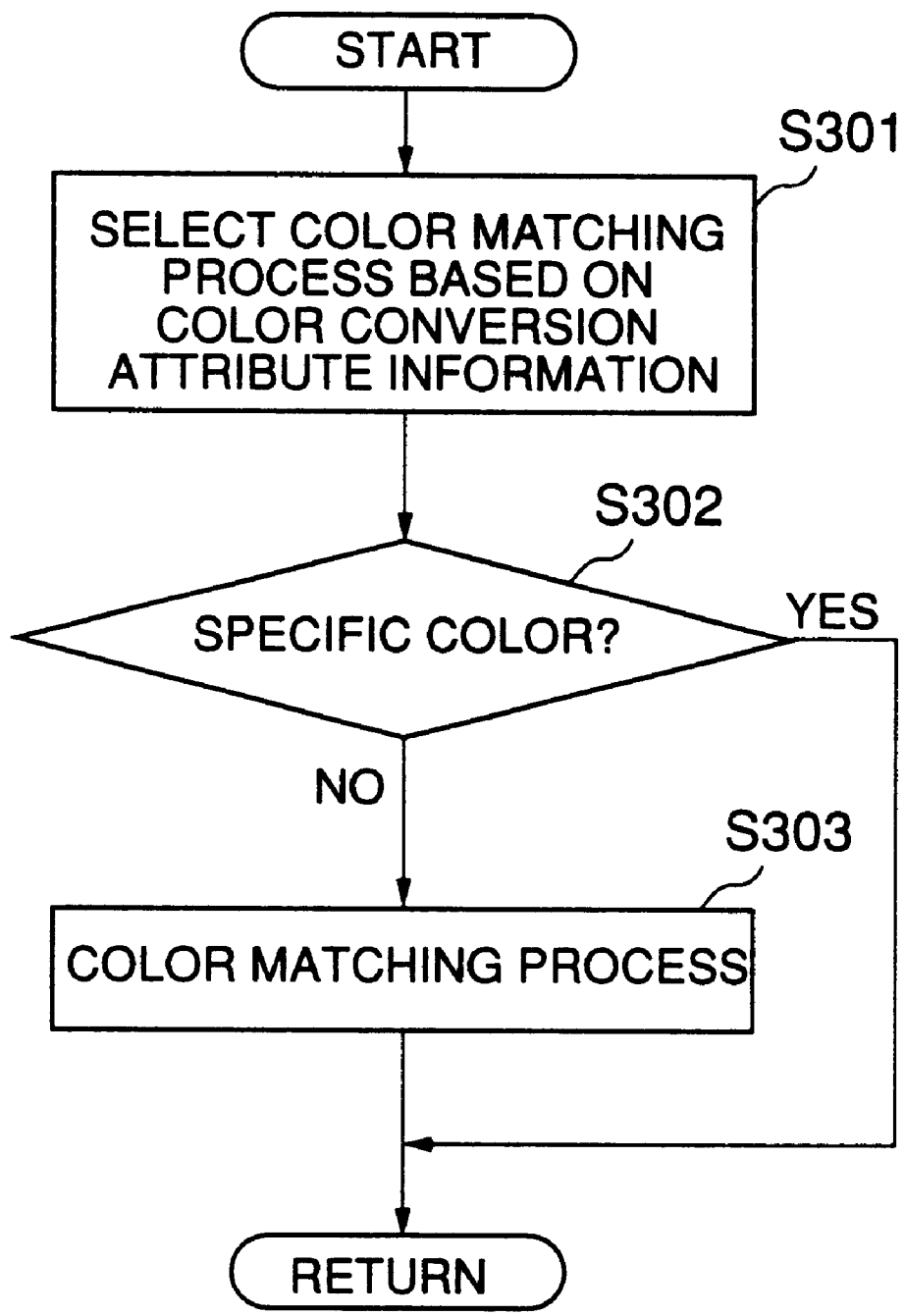
FIG. 4 is a flowchart of a color matching process performed by a color conversion engine shown in FIG. 1.

Thereafter, the color conversion engine 12 applies, in step S203, the color matching process based on the color conversion command. A description will now be given, with reference to FIG. 4, of a color matching process performed by the color conversion engine 12 in step S203.

When the color conversion engine 12 receives the color conversion command and the drawing color information from the drawing module 11, the color conversion engine 12 selects, in step S301, a corresponding color matching process based on the color conversion attribute information attached to the color conversion command. Then, in step S302, the color discriminating section 17 determines whether the color of the drawing object is the specific color.

If it is determined, in step S302, that the color of the drawing object is not the specific color, the color discriminating section 17 outputs a result of the determination to the color conversion engine 12. Then, in step S303, the color conversion engine 12 applies the color matching process to the received drawing color information in accordance with the result of the determination of the color discriminating section 17. Thereafter, the color conversion engine 12 outputs the drawing color information subjected to the color matching process to the drawing module 11.

On the other hand, if it is determined, in step S302, that the color of the drawing object is the specific color, the color discriminating section 17 outputs the result of the determination to the color conversion engine 12. Then, the color conversion engine 12 outputs the drawing color information to the drawing module 11 without applying the color matching process to the received drawing color information in accordance with the result of the determination of the color discriminating section 17.

Returning to FIG. 3, the drawing module 11 receives the drawing color information from the color conversion engine 12, and outputs, in step S204, the drawing color information to the printer driver 13 together with the drawing command. The drawing color information received from the color conversion engine 12 has been subjected to the color matching process or has not been subjected to the color matching process.

The printer driver 13 receives the drawing command and the drawing color information, and converts the drawing command into a drawing command peculiar to the printer 14. Then, the printer driver 13 outputs, in step S205, the converted drawing command to the printer 14 together with the drawing color information.

As mentioned above, according to the color conversion processing system according to the present invention, it is determined whether or not the color of each drawing object to be drawn is the specific color when a color matching process is applied. The specific color corresponds to a color which easily generates a matching error. If the color of the drawing object is the specific color, the color matching process is not applied. Accordingly, the matching error can be positively avoided, which achieves an appropriate output of the printer.

It should be noted that, in the color conversion processing system according to the present embodiment, when the drawing object is a graphic image such as a bar graph represented by rectangular areas painted in, for example, red, blue and yellow, it is determined whether or not the color is the specific color for each of red, blue and yellow. The color matching process is not applied when the color is red, whereas the color matching process is applied when the color is either blue or yellow. That is, there may be colors which are subjected to the color matching process and not subjected to the color matching process in a single drawing object.

Second Embodiment

A description will now be given of a second embodiment according to the present invention. A system structure of a color conversion processing system according to the second embodiment of the present invention is the same as the color conversion processing system shown in FIG. 1, and descriptions thereof will be omitted.

In the color conversion processing system according to the second embodiment, the specific color can be designated by the application program 10. That is, when a user selects application of the color matching process, the user operates the application program 10 so as to the drawing attribute information for each drawing object. By expanding a function of the application program 10, the user can designate the specific color as the drawing attribute information.

Figure 5:
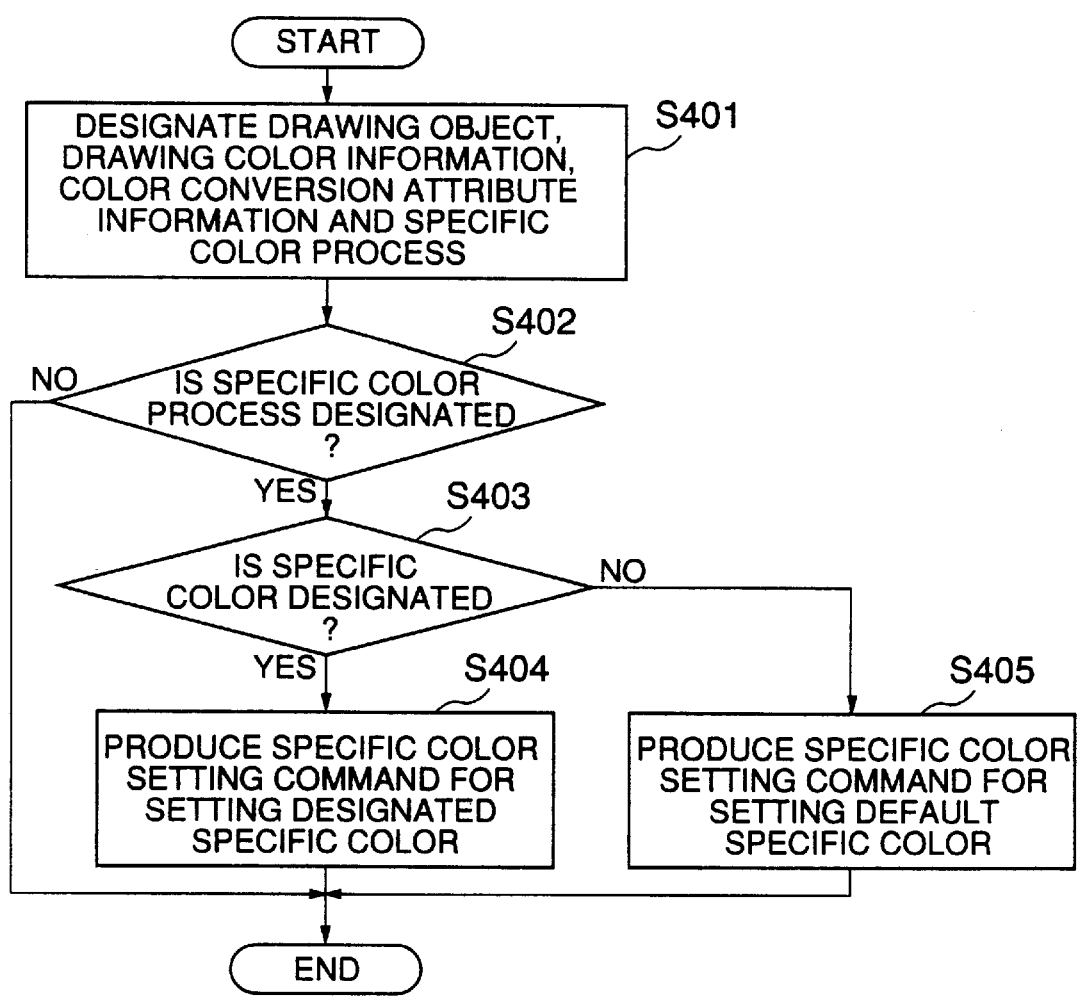
FIG. 5 is a flowchart of a process for setting a specific color for an object to be drawn in a color conversion processing system according to a second embodiment of the present invention.

FIG. 5 is a flowchart of a process for setting the specific color for each drawing object by the application program 10.

It is assumed that a user designates a drawing method for a drawing object (for example, a rectangle) via the interface section 18 of the application program 10. In this case, the user designates, in step S401, the object to be drawn and drawing color information of the drawing object. Additionally, if the user desires a color matching, the user designates color conversion attribute information corresponding to the drawing object (or a default value), and also designates a presence of a specific color process system for the specific color. If the presence of the specific color process is present, the user designates the specific color, if necessary. It should be noted that when there are a plurality of colors for the drawing object, the number of the specific colors which can be designated is not limited to one.

Thereafter, the application program 10 determines, in step S402, whether or not there is a designation for the specific color process based on the designation of the user through the interface section 18. If a specific color process is not designated, the routine is ended.

On the other hand, if it is determined, in step S402, that the specific color process is designated, it is determined, in step S403, whether or not the specific color is designated. If it is determined, in step S403, that the specific color is designated, a specific color setting command is produced, in step S404, for setting the specific color in the color discriminating section 17.

If it is determined, in step S403, that the specific color is not designated, a specific color producing command is generated, in step S405, so as to set a default specific color of the application program 10 in the color discriminating section 17. However, when the specific color is not designated, a specific color previously set in the color discriminating section 17 may be used as described in the first embodiment.

According to the specific color process and the setting of the specific color being performed by the application program 10, a color desired by the user can be set as the specific color for each drawing object.

A description will now be given of a color conversion processing method based on the condition established by the above-mentioned specified color process. It should be noted that the entire process of the color conversion processing method according to the second embodiment of the present invention is the same as the process shown in FIG. 3.

Figure 6:
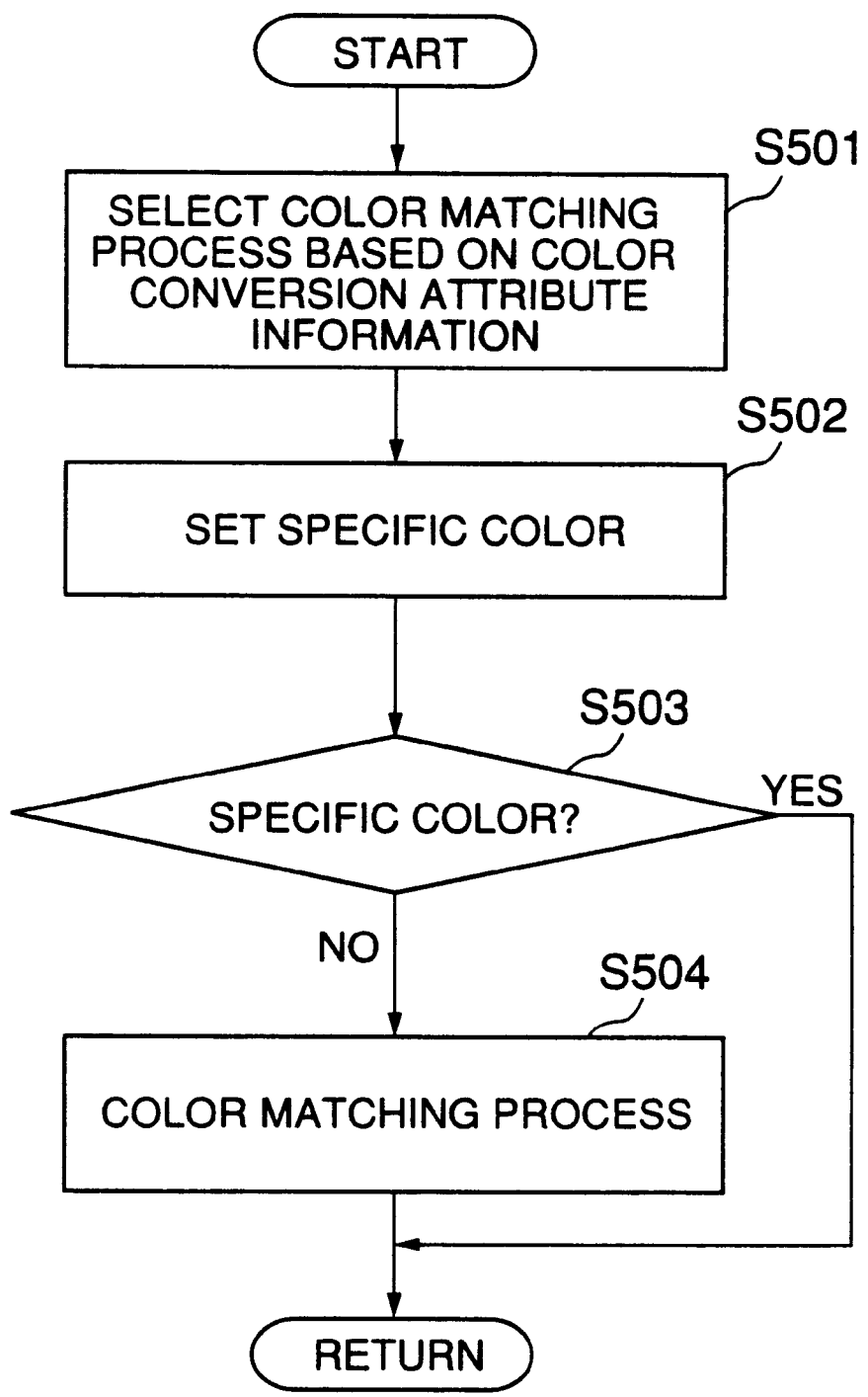
FIG. 6 is a flowchart of a color matching process performed by a color conversion engine of the color conversion processing system according to the second embodiment of the present invention.

FIG. 6 is a flowchart of a color matching process performed by the color conversion engine 12 in the second embodiment of the present invention.

When the color conversion engine 12 receives from the drawing module 11 the color conversion command, the drawing color information and the specific color setting command, the color conversion engine 12 selects, in step S501, a corresponding color matching process in accordance with the color attribute information attached to the color conversion command.

Then, the color discriminating section 17 inputs, in step S502, the drawing color information and the specific color setting command, and sets the specific color in accordance with the input specific color setting command.

Thereafter, the color discriminating section 17 determines, in step S503, whether or not the color of the drawing object is the specific color set in step S502 in accordance with the input drawing color information.

If it is determined, in step S503, that the color of the drawing object is not the specific color, the color discriminating section 17 outputs the result to the color conversion engine 12. The color conversion engine 12 applies, in step S504, the color matching process to the input drawing color information in accordance with the result of determination of the color discriminating section 17. Thereafter, the color conversion engine 12 outputs the drawing color information which has been subjected to the color matching process to the drawing module 11.

On the other hand, if it is determined, in step S503, that the color of the drawing object is the specific color, the color discriminating section 17 outputs the result to the color conversion engine 12. The color conversion engine 12 outputs the drawing color information to the drawing module 11 without applying the color matching process to the drawing color information in accordance with the result of determination of the color discriminating section 17.

It should be noted that when a plurality of colors are designated to the drawing object, the process of steps S503 and S504 is repeated for the number of colors so as to complete the color matching process for the drawing object. When there is a plurality of drawing objects, the process of steps S501 through S504 is repeated for the number of the drawing objects.

As mentioned above, in the color conversion process system according to the present embodiment, the specific color can be set for each drawing object, and the specific color process can be performed for each drawing object. Additionally, the color matching process is not performed for a desired color. Accordingly, an appropriate color matching process can be applied for each drawing object, and generation of a matching error can be suppressed.

Specifically, when the drawing object is a graphic image such as a bar graph represented by rectangular areas painted in, for example, red, blue and yellow, and when yellow is designated as the specific color, the color matching process is applied to red and blue and the color matching process is not applied to yellow. That is, a color which should not be subjected to the color matching process can be discriminated from colors which are to be subjected to the color matching process.

Third Embodiment

A description will now be given of a third embodiment according to the present invention. A system structure of a color conversion processing system according to the third embodiment of the present invention is the same as the color conversion processing method shown in FIG. 1, and descriptions thereof will be omitted.

In the color conversion processing system according to the third embodiment of the present invention, a drawing object in one of colors other than the specific color is subjected to a color matching process according to a color matching process previously designated by a user. On the other hand, a drawing object in a specific color is subjected to a color matching process according to a color matching process which is more appropriate for the drawing object. The color matching method is selected from previously selected color matching process.

Figure 7:
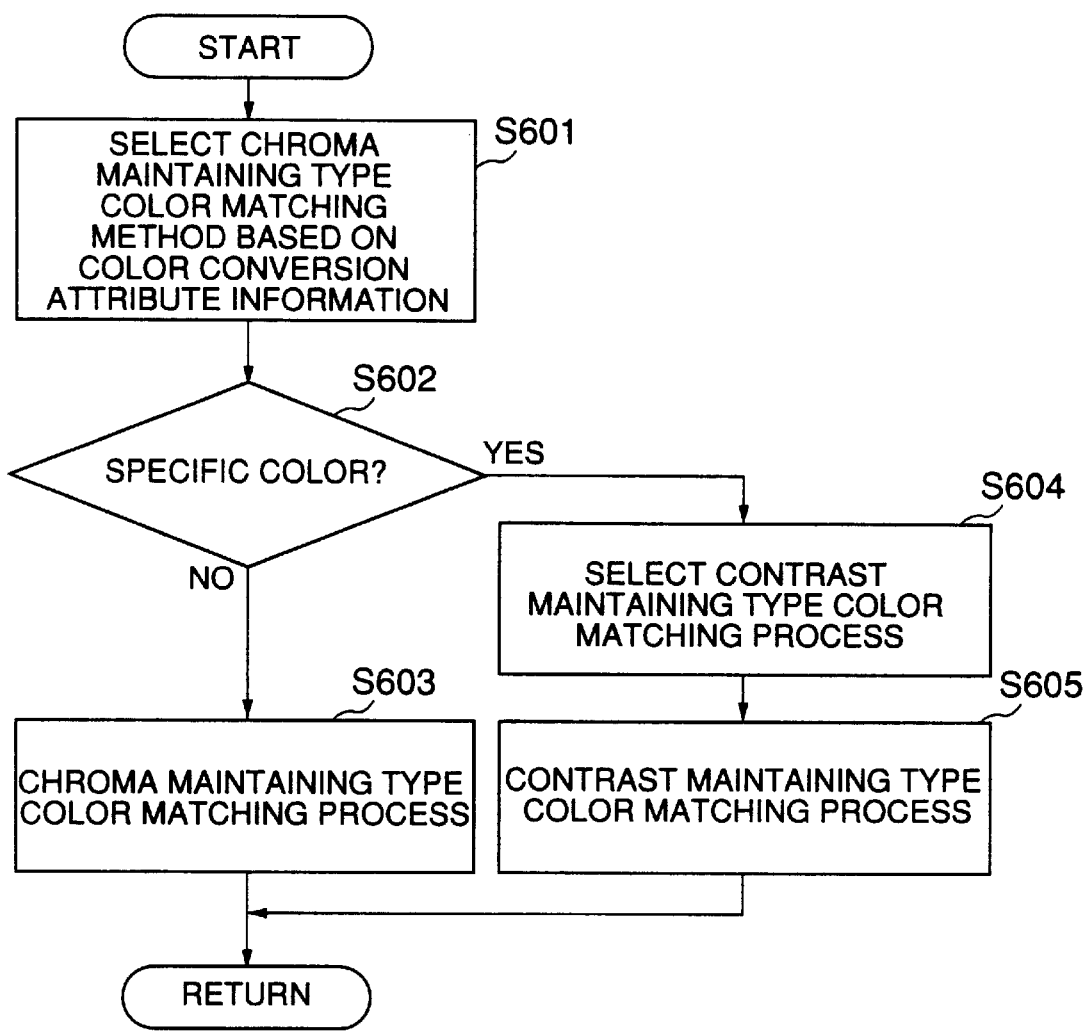
FIG. 7 is a flowchart of a color matching process performed by a color conversion engine of a color conversion processing system according to a third embodiment of the present invention.

FIG. 7 is a flowchart of a color matching process performed by the color conversion engine 12 in the color conversion processing system according to the third embodiment of the present invention. In the color conversion engine 12, the color discriminating section 17 holds a specific color as described in the above-mentioned first embodiment. The color conversion engine 12 is constructed to select an appropriate color matching process (a contrast maintaining type is used in the present embodiment) for a drawing object when the color of the drawing object is the same as the specific color held in the color discriminating section 17.

When the color conversion engine 12 receives the color conversion command and the drawing color information from the drawing module 11, the color conversion engine 12 selects, in step S601, a color matching process which is attached to the color conversion command. In the present embodiment, it is assumed that a chroma maintaining type color matching process is designated, and thus the color conversion engine 12 selects the chroma maintaining type color matching process.

Then, the color discriminating section 17 determines, in step S602, whether or not the color of the drawing object is the specific color based on the received drawing color information.

If it is determined in step S602, that the color of the drawing object is not the specific color, the routine proceeds to step S603. In step S603, the color conversion engine 12 applies a chroma maintaining type color matching process to the drawing object in accordance with the result of determination of the color discriminating section 17. Then, the color conversion engine 12 outputs to the drawing module 11 the drawing color information which has been subjected to the color matching process.

On the other hand, if the color of the drawing object is the specific color, the color discriminating section 17 outputs the result of the determination to the color conversion engine 12. Then the color conversion engine 12 selects, in step S604, a previously set contrast maintaining type color matching method, and applies, in step S605, the contrast maintaining type color matching process. Thereafter, the color conversion engine 12 outputs to the drawing module 11 the drawing color information which has been subjected to the contrast maintaining type color matching process.

If a plurality of colors are designated for the drawing object, the process of steps S602 through step S605 is repeated for the number of colors of the drawing object so as to complete the color matching process for the drawing object. Additionally, if a plurality of drawing objects are provided, the process of steps S601 through step S605 is repeated for each drawing object.

As mentioned above, in the color conversion processing system according to the present embodiment, if the color of the drawing object is the specific color, the color matching process can be switched to a color matching process which is appropriate for the specific color. Thus, an appropriate color matching process can be applied to each drawing object.

That is, if the drawing object is a graphic image such as a bar graph including rectangular areas painted in red, blue and yellow and if the chroma maintaining type color matching process is designated as the color conversion attribute information, the chroma maintaining type color matching process is applied to red and blue while the contrast maintaining type color matching process is applied to yellow which is the specific color. Thus, in the color conversion processing system according to the third embodiment of the present invention, the color matching process can be switched for each color in a single drawing object.

Fourth Embodiment

A description will now be given of a fourth embodiment according to the present invention. A system structure of a color conversion processing system according to the fourth embodiment of the present invention is the same as the color conversion processing method shown in FIG. 1, and descriptions thereof will be omitted.

In the color conversion processing system according to the present invention, a color matching process can be selected for the specific color by the application program 10. That is, a user can designate a color matching process for the specific color as attribute information for each drawing object. This is achieved by expanding a function of the application program 10.

Figure 8:
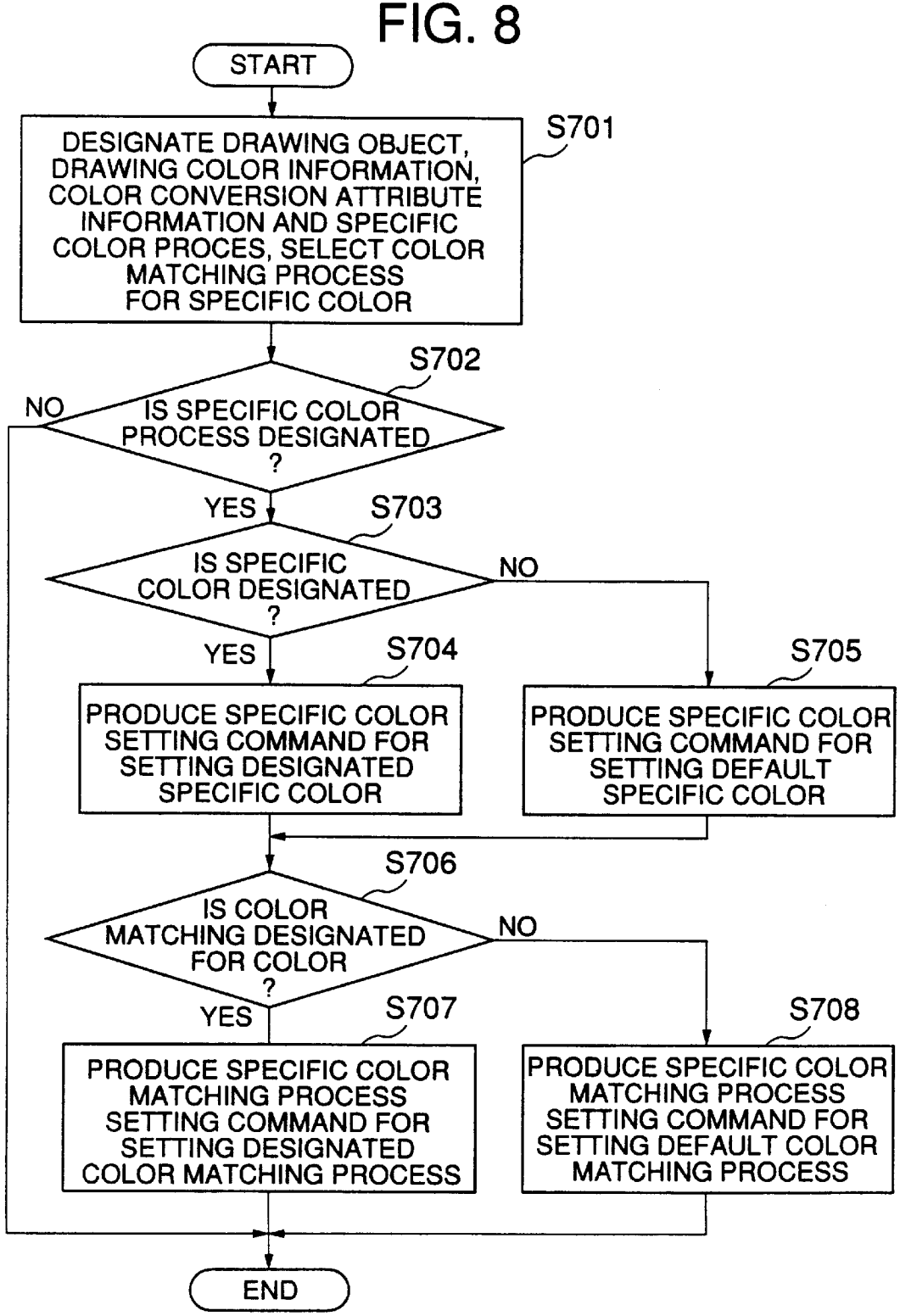
FIG. 8 is a flowchart of a process for setting a specific color for an object to be drawn and for setting a color matching process for the specific color in a color conversion processing system according to a fourth embodiment of the present invention.

FIG. 8 is a flowchart of a process for setting the specific color and the color matching process for the specific color for each drawing object by the application program 10.

It is assumed that a user designates a drawing method for a drawing object (for example, a rectangle) via the interface section 18 of the application program 10. In this case, the user designates, in step S701, the object to be drawn and drawing color information of the drawing object. Additionally, if the user desires a color matching, the user designates color conversion attribute information corresponding to the drawing object (or a default value), and also designates a presence of a specific color process for the specific color. If the presence of the specific color process is designated, the user designates the specific color, if necessary. It should be noted that when there are a plurality of colors for the drawing object, the number of the specific colors which can be designated is not limited to one.

Thereafter, the application program 10 determines, in step S702, whether or not there is a designation for the specific color process based on the designation of the user through the interface section 18. If a specific color process is not designated, the routine is ended.

On the other hand, if it is determined, in step S702, that the specific color process is designated, it is determined, in step 703, whether or not the specific color is designated. If it is determined, in step S703, that the specific color is designated, a specific color setting command is produced, in step S704, so as to set the specific color in the application program 10. On the other hand, if it is determined, in step S703, that the specific color is not designated, a specific color producing command is generated so as to set a default specific color of the application program 10 in the color discriminating section 17. However, when the specific color is not designated, a specific color previously set in the color discriminating section 17 may be used as described in the first embodiment.

Thereafter, it is determined, in step S706, whether or not a color matching process is designated for the specific color. If it is determined, in step S706, that a color matching process is designated for the specific color, a specific color matching process setting command is produced, in step S707, so as to set in the color conversion engine 12 the color matching process for the specific color. On the other hand, is it is determined, in step S706, that a color matching process is not designated for the specific color, a specific color matching process setting command is produced, in step S708, so as to set in the application program 10 a default color matching process provided in the application program 10. It should be noted that a color matching process provided in the color conversion engine 12 may be used when a color matching process is not designated for the specific color.

According to the setting of the specific color and the setting of the color matching process performed by the application program 10, a color matching process desired by the user can be achieved.

A description will now be given of a color matching process based on a condition established by the above-mentioned setting process. It should be noted that since the color conversion processing method is the same as that shown in FIG. 3, a description will be given of only the color matching process in step S203 of FIG. 3.

Figure 9:
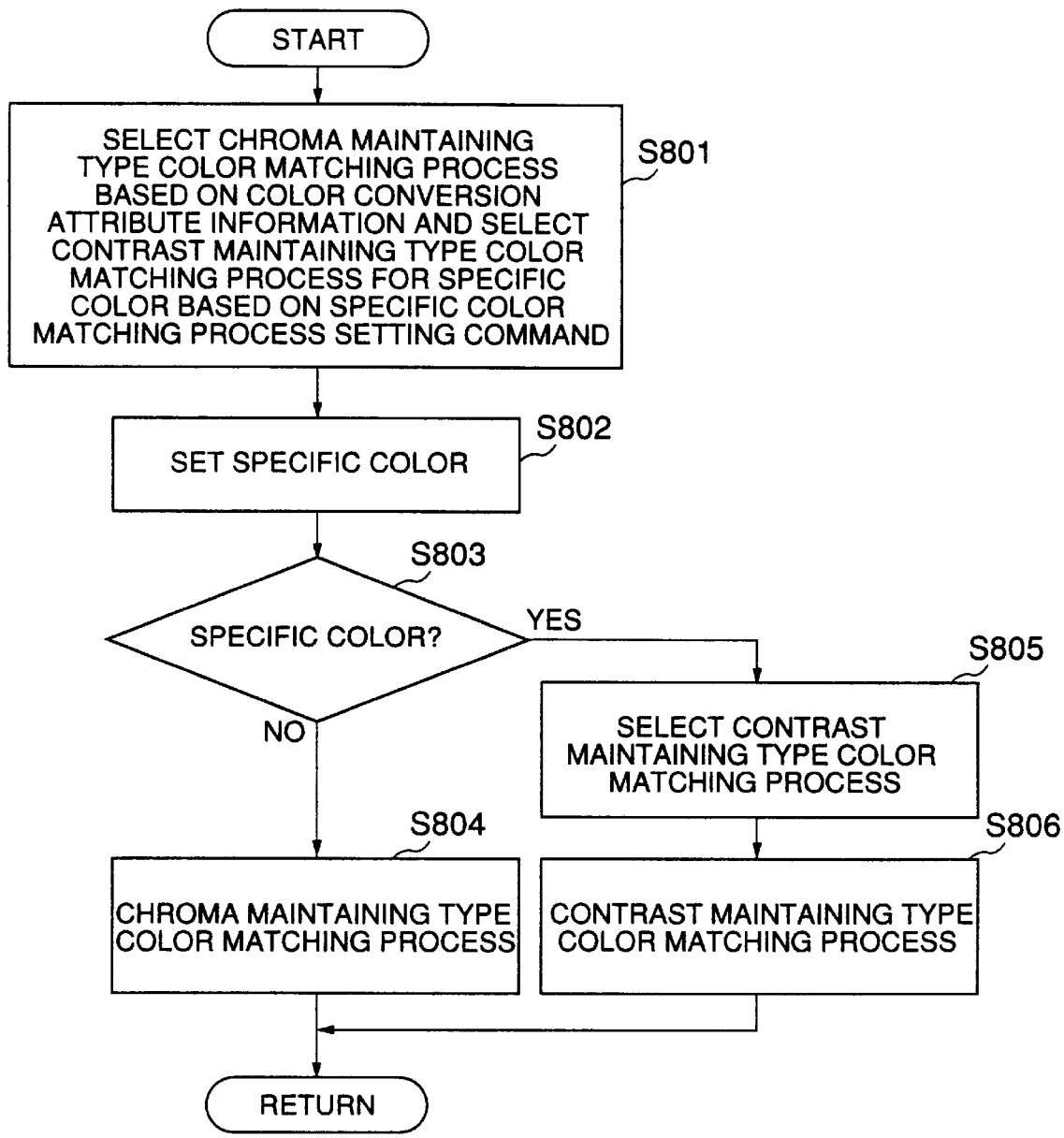
FIG. 9 is a flowchart of a color matching process performed by a color conversion engine of the color conversion processing system according to the fourth embodiment of the present invention.

FIG. 9 is a flowchart of the color matching process performed by the color conversion engine 12 in color conversion processing method according to the second embodiment of the present invention.

When, the color conversion engine 12 receives the color conversion command and the drawing color information from the drawing module 11, the color conversion engine 12 selects, in step S801, a color matching process based on the color conversion attribute information attached to the color conversion command. In the present embodiment, it is assumed that the chroma maintaining type color matching process is selected as the color matching process. Additionally, the color conversion engine 12 sets a corresponding color matching process for the specific color so that the color matching process can be used immediately. In the present embodiment, it is assumed that a contrast maintaining type color matching method is selected based on the specific color matching setting command, and thus the contrast maintaining type color matching process is set based on the specific color matching process setting command.

Then, in step S802, the color discriminating section receives the drawing color information and the specific color matching process setting command, and sets the specific color based on the received specific color matching process setting command. Thereafter, the color discriminating section 17 determines, in step S803, whether or not the color of the drawing object is the specific color set in step S802 based on the received drawing color information.

If it is determined in step S803, that the color of the drawing object is not the specific color, the routine proceeds to step S804. In step S804, the color conversion engine 12 applies the chroma maintaining type color matching process to the drawing color information in accordance with the result of the determination of the color discriminating section 17. Then, the color conversion engine 12 outputs to the drawing module 11 the drawing color information which has been subjected to the chroma maintaining type color matching process.

On the other hand, if the color of the drawing object is the specific color, the color discriminating section 17 outputs the result of the determination to the color conversion engine 12. Then the color conversion engine 12 selects, in step S805, a previously set contrast maintaining type color matching process, and applies, in step S806, the selected contrast maintaining type color matching process to the received drawing color information. Thereafter, the color conversion engine 12 outputs to the drawing module 11 the drawing color information which has been subjected to the contrast maintaining type color matching process.

If a plurality of colors are designated for the drawing object, the process of steps S803 through step S806 is repeated for the number colors of the drawing object so as to complete the color matching process for the drawing object. Additionally, if a plurality of drawing objects are provided, the process of steps S801 through step S806 is repeated for each drawing object.

As mentioned above, in the color conversion processing system according to the present embodiment, since the specific color and the color matching process to be applied to the specific color can be set for each drawing object, a color matching process can be performed by using an arbitrary process for either the color which is not the specific color or the color which is the specific color for each drawing object.

That is, if the drawing object is a graphic image such as a bar graph including rectangular areas painted in red, blue and yellow and if yellow is designated as the specific color, the chroma maintaining type color matching process is applied to red and blue while the contrast maintaining type color matching process is applied to yellow which is the specific color. Thus, in the color conversion processing system according to the fourth embodiment of the present invention, the color matching process can be performed by using different color matching methods in response to the drawing object, resulting in a color matching process conforming to the user's preference.

Fifth Embodiment

According to the color conversion processing systems of the above-mentioned first to fourth embodiments, a matching error can be eliminated for the specific color. However, there may be a problem occurring when the specific color is used in a part of an image having a color gradation. That is, if the specific color is used as one of component colors in a color gradation image and if a different color matching process is applied to the specific color or if a color matching process is not applied to the specific color, a continuity of colors may be deteriorated at a portion of the specific color.

The above-mentioned problem can be prevented by applying the specific color process for only drawing objects which do not include a color gradation. In a normal application program, a character image is not subjected to gradation. Otherwise, a character image having color gradation is handled as a graphic image. Accordingly, the above-mentioned problem can be eliminated by limiting application of the specific color process to a character image.

Figure 10:
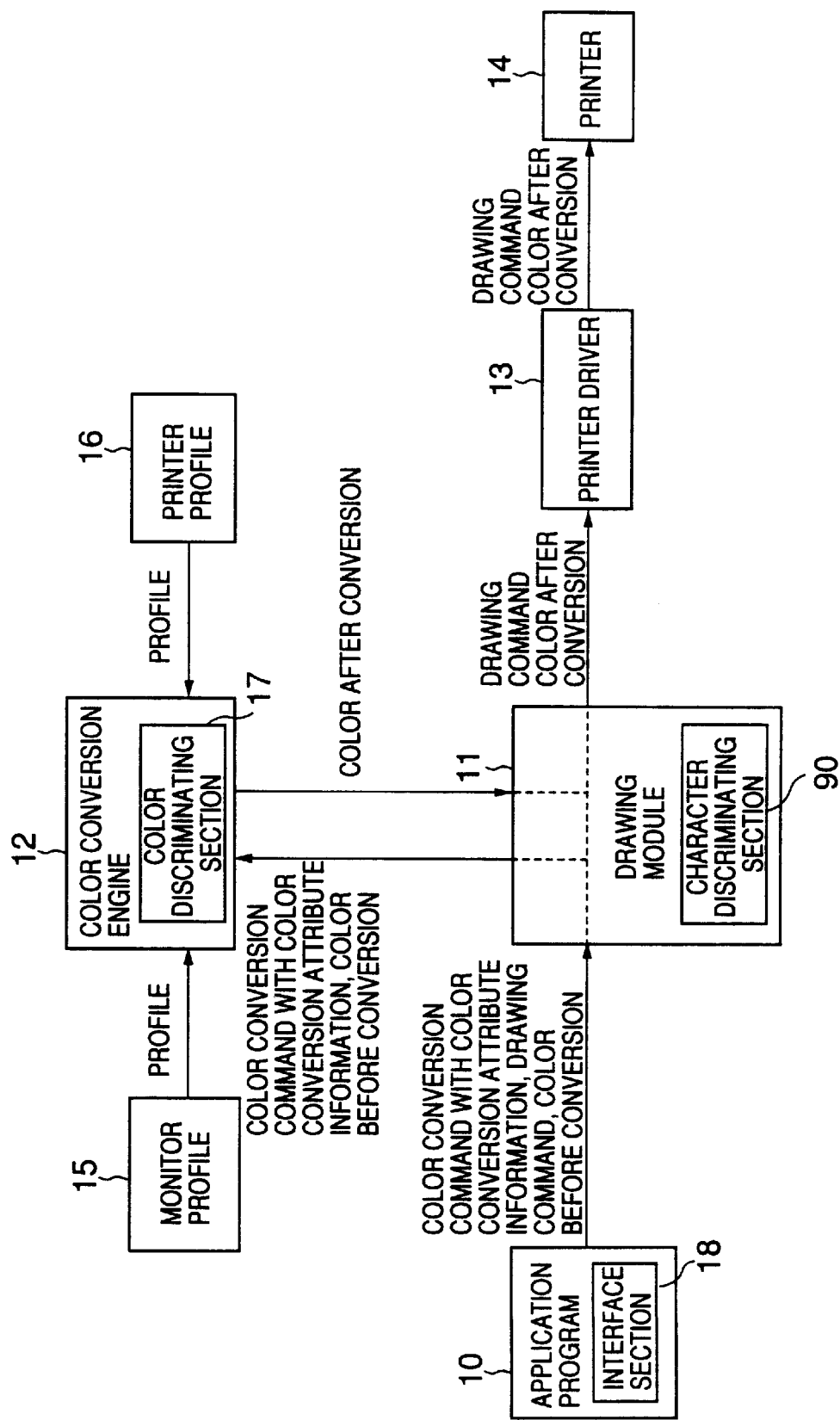
FIG. 10 is a block diagram of a color conversion processing system according to a fifth embodiment of the present invention.

FIG. 10 is a block diagram of a color conversion processing system according to a fifth embodiment of the present invention. The color conversion processing system shown in FIG. 10 has the same structure as the color conversion processing system shown in FIG. 1 except for a character discriminating section 90 provided in the drawing module 11. The character discriminating section 90 determines whether or not each drawing object is a character image based on the drawing command output from the application program 10.

It should be noted that although the character discriminating section 90 is provided in the drawing module 11 in the present embodiment, the color discriminating section 90 may be provided in the color conversion engine 12 or parts other than the color conversion engine 12. That is, the character discriminating section 90 can be provided at any position as long as the character discriminating section 90 can determine whether the drawing command image is a character image before a color matching process is started in the color conversion engine 12.

Figure 11:
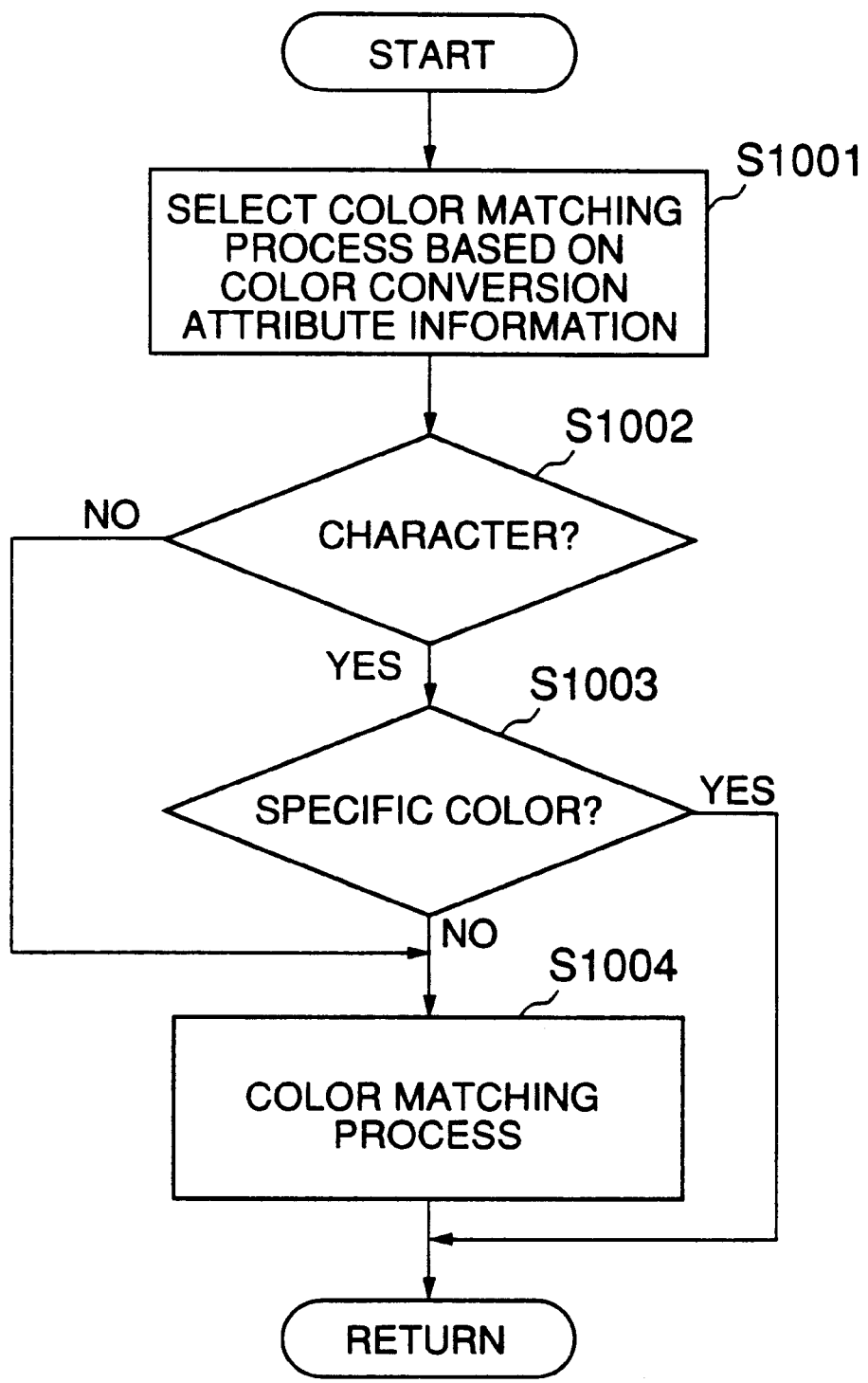
FIG. 11 is a flowchart of a color matching process performed by a color conversion engine of the color conversion processing system according to the fifth embodiment of the present invention.

A description will now be given of a color conversion processing method performed in the color conversion processing system according to the fifth embodiment of the present invention. The entire operation of the color conversion processing system according to the fifth invention is the same as that shown in FIG. 3 and, thus, a description will be given of only step S203. FIG. 11 is a flowchart of a color matching process performed by the color conversion engine 12 of the color conversion processing system according to the fifth embodiment.

The character discriminating section 90 receives the drawing command with respect to a drawing object output from the application program 10, and determines whether or not the drawing object is a character image based on the received drawing command. Then, the character discriminating section 90 outputs a result of the determination to the color conversion engine 12. This process is performed prior to the process of FIG. 11.

When the color conversion engine 12 receives the color conversion command and the drawing color information from the drawing module 11, the color conversion engine 12 selects, in step S1001, a corresponding color matching process based on the color conversion attribute information attached to the color conversion command.

Then, the color conversion engine 12 determines whether the drawing object is a character image based on the result of the determination received from the character discriminating section 90. If it is determined, in step S1002, that the drawing object is not a character image, the routine proceeds to step S1004. In step S1004, the color conversion engine 12 applies a color matching process to the drawing color information, and outputs the drawing color information to the drawing module 11.

On the other hand, if it is determined, in step S1002, that the drawing object is a character image, the color conversion engine 12 outputs a specific color discriminating command to the color discriminating section 17 and then the routine proceeds to step S1003. In step S1003, the color discriminating section 17 determines whether or not the color of the drawing object is the specific color based on the received drawing color information in response to the specific color discriminating command.

If it is determined, in step S1003, that the color of the drawing object is not the specific color, the color discriminating section 17 outputs a result of the determination to the color conversion engine 12. Then, in step S1004, the color conversion engine 12 applies the color matching process to the received drawing color information in accordance with the result of the determination of the color discriminating section 17. Thereafter, the color conversion engine 12 outputs the drawing color information subjected to the color matching process to the drawing module 11.

On the other hand, if it is determined, in step S1003, that the color of the drawing object is the specific color, the color discriminating section 17 outputs the result of the determination to the color conversion engine 12. Then, the color conversion engine 12 outputs the drawing color information to the drawing module 11 without applying the color matching process to the received drawing color information in accordance with the result of the determination of the color discriminating section 17.

According to the present embodiment, it is determined whether or not the drawing object is a character image so as to apply the specific color process to only a character image. Thus, the drawing object can be prevented from being subjected to the specific color process, resulting in prevention of discontinuity of color variation. Accordingly, a matching error can be suppressed which results in a natural color print output from a printer.

Sixth Embodiment

A description will now be given of a sixth embodiment of the present invention. In the sixth embodiment of the present invention, a printer driver which is compatible with a color matching system is provided in a computer which performs the color conversion processing system.

Figure 12:
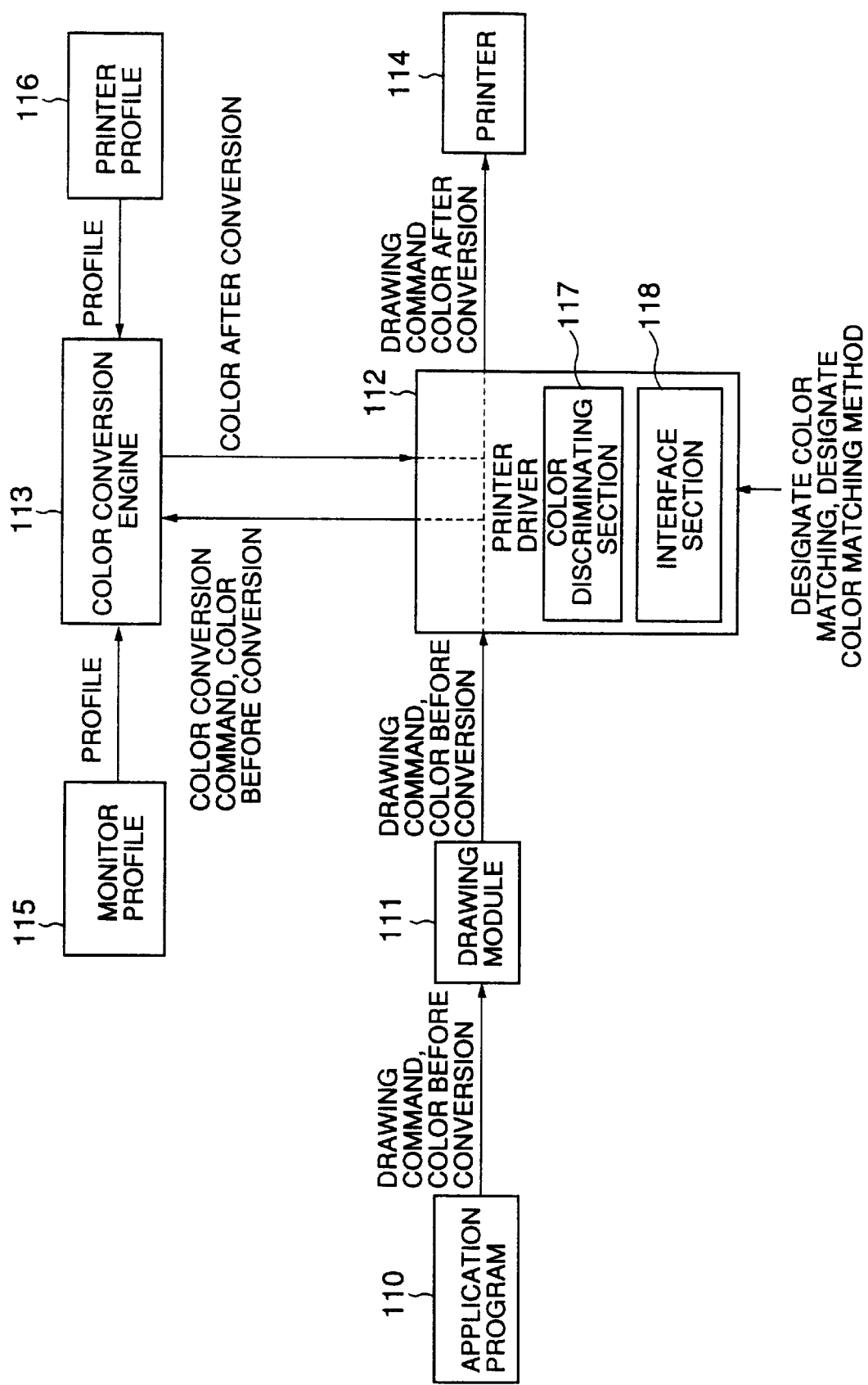
FIG. 12 is a block diagram of a color conversion processing system according to a sixth embodiment of the present invention.

FIG. 12 is a block diagram of the color conversion processing system according to the sixth embodiment of the present invention. In FIG. 12, the color conversion processing system according to the sixth embodiment of the present invention comprises an application program 110, a drawing module 111, a printer driver 112, a color conversion engine 113 and a printer 114.

In the above-mentioned first to fifth embodiments, the color matching process is controlled by the application program. However, issuance of the color conversion command can be performed by the device driver when the application program does not have a function to issue the color conversion command. As shown in FIG. 12, the color conversion engine 113 is provided separately from the drawing module 111 in the operating system so that the color matching process of the color conversion engine 113 can be used through the printer driver 112.

In FIG. 12, the application program 110 is capable of producing color image information of a drawing object such as a bit map image, a character image and a graphic image. The application program 110 outputs a drawing command (print command) and drawing color information indicating a color of the drawing object for each drawing object.

The drawing module 111 is provided in the operating system. The drawing module 111 controls a drawing process for a color image outputting apparatus such as a monitor display or a printer. The drawing module 11 receives the above-mentioned drawing command and drawing color information from the application program 110, and outputs the drawing command and the drawing color information to the printer 112.

Similar to the application program 10 of the first to fifth embodiments, the printer driver 112 is provided with an interface section 118 for a user. Specifically, the interface section 118 includes a function of displaying screens for setting a paper size or a printing direction or for displaying a list of setting values. A presence of color matching or a designation of the color matching process can be designated through the interface section 118.

The printer driver 112 also is provided with a color discriminating section 117 which receives the drawing color information from the drawing module 111 and determines whether or not the color of the drawing object is the specific color. It should be noted that the color discriminating section 117 functions the same as that of the color discriminating section 17 of the first to fourth embodiments, and a description thereof will be omitted.

The printer driver 112 outputs to the color conversion engine 113 the color conversion command having the color conversion attribute information of the designated color matching process and the drawing color information based on the result of the determination of the color discriminating section 117. Also, the printer driver 112 converts the received drawing command into a drawing command peculiar to the printer 114, and outputs the converted drawing command to the printer 114 together with the drawing color information which has been subjected to the color matching process. On the other hand, if the color of the drawing command is the specific color, the printer driver 12 converts the received drawing command into the drawing command peculiar to the printer 114, and sends the converted drawing command to the printer 114 together with the received drawing color information.

The color conversion engine 113 is provided in the operating system. The color conversion engine. 113 receives a monitor profile 115 and a printer profile 116. The color conversion engine 113 also receives color image information of an image being displayed on a display monitor (not shown in the figure) so as to apply a color matching process to the color image information so that the color image information matches a color representation characteristic of the printer 114. The printer 114 can be of any type including a laser printer or an inkjet printer as long as a printing operation can be performed based on color image information.

Figure 13:
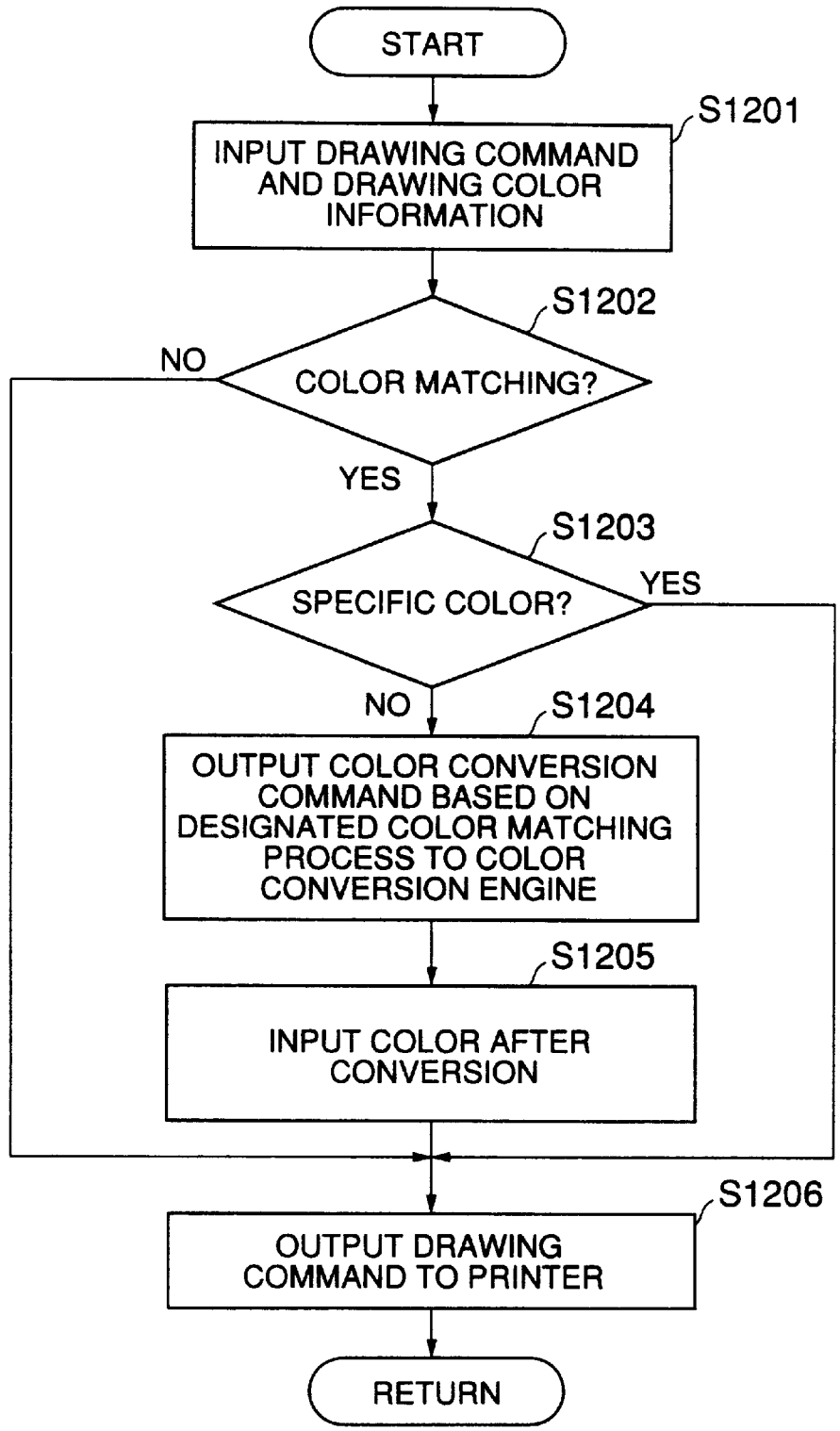
FIG. 13 is a flowchart of a color conversion processing method performed by the color conversion processing system according to the sixth embodiment of the present invention.

A description will now be given of a color conversion processing method performed in the color conversion processing system according to the present embodiment. FIG. 13 is a flowchart of a color matching processing method using the color conversion processing method according to the sixth embodiment of the present invention.

The application program 110 outputs the drawing command of the drawing object and the drawing color information to the drawing module 111. The drawing module 111 receives the drawing command and the drawing color information, and outputs the received drawing command and the drawing color information to the printer driver 112. Accordingly, the printer driver 112 receives, in step S1201, the drawing command and the drawing color information from the drawing module 111.

Upon receipt of the drawing command and the drawing color information, the printer driver 112 determines, in step S1202, whether or not use of a color matching is designated by the user through the interface section 118. If use of the color matching is not designated, the routine proceeds to step S1206 so as to convert the received drawing command into a drawing command peculiar to the printer 114. The converted drawing command is output to the printer 114 together with the drawing color information.

On the other hand, if use of the color matching is designated, in step S1202, the printer driver 112 outputs a specific color discriminating command to the color discriminating section 117. The specific color discriminating command instructs to determine whether or not the color of a drawing object is the specific color. The color discriminating section 117 then determines, in step S1203, whether or not the color of the drawing object indicated by the received drawing color information is the specific color If it is determined, in step S1203, that the color of the drawing object is not the specific color, the color discriminating section 117 outputs the result of determination to the printer driver 112. The printer driver 112 then outputs, in step S1204, the color conversion command and the drawing color information to the color conversion engine 113, the color conversion command being provided with the color matching method which was designated through the interface section 118 in accordance with the result of determination of the color discriminating section 117.

As a result, a color matching process can be performed with respect to the drawing color information by using the designated color matching method. Additionally, the printer driver 112 converts the drawing command into a drawing command peculiar to the printer 114.

Thereafter, the printer driver 112 receives, in step S1205, the drawing color information which has been subjected to the color matching process, and outputs, in step S1206, the drawing color information to the printer 114 together with the converted drawing command.

On the other hand, if it is determined, in step S1203, that the color of the drawing object is the specific color, the color discriminating section 117 outputs a result of the determination to the printer driver 112. The printer driver 112 outputs the received drawing color information to the printer 114 together with the converted drawing command. That is, the drawing color information and the converted drawing command are not output to the color conversion engine 113.

As mentioned above, according to the color conversion processing method according to the present embodiment, it is determined whether or not the color of the drawing object is the specific color which tends to create a matching error. If it is determined that the color of the drawing object is the specific color, the color matching process is not applied to the drawing object. Thus, the matching error can be positively eliminated, resulting in an appropriate output of the printer.

If the drawing object is a graphic image such as a bar graph including rectangular areas painted in red, blue and yellow, it is determined whether each of the colors is the specific color. Accordingly, there may be a case in which a single drawing object includes a color which is subjected to the color matching process and a color which is not subjected to the color matching process.

Seventh Embodiment

A description will now be given of a color conversion processing system according to a seventh embodiment of the present invention. The color conversion processing system according to the seventh embodiment of the present invention has the same structure as that shown in FIG. 12, and description thereof will be omitted. In the color conversion processing system according to the seventh embodiment, the specific color can be set by the printer driver 112.

When a user selects to apply a color matching process, the user a sets drawing attribute for each drawing object by operating the printer driver. Accordingly, the user can set a desired color as the specific color by designating the specific color through the interface section 118.

That is, when the user designates use of a color matching or a color matching process, a desired specific color is set in the color discriminating section 117 through the interface section 118. Thereby, the specific color designated by the user is used for color discrimination by the color discriminating section 117 in the process of step S1203 shown in FIG. 13. It should be noted that the operation of the color conversion processing system according to the present embodiment is the same as that of the sixth embodiment except for the above-mentioned specific color designating process, and descriptions thereof will be omitted.

As mentioned above, according to the color conversion processing method according to the present embodiment, since the user can set a desired color as the specific color, the user can optimize the color matching process.

Eighth Embodiment

Figure 14:
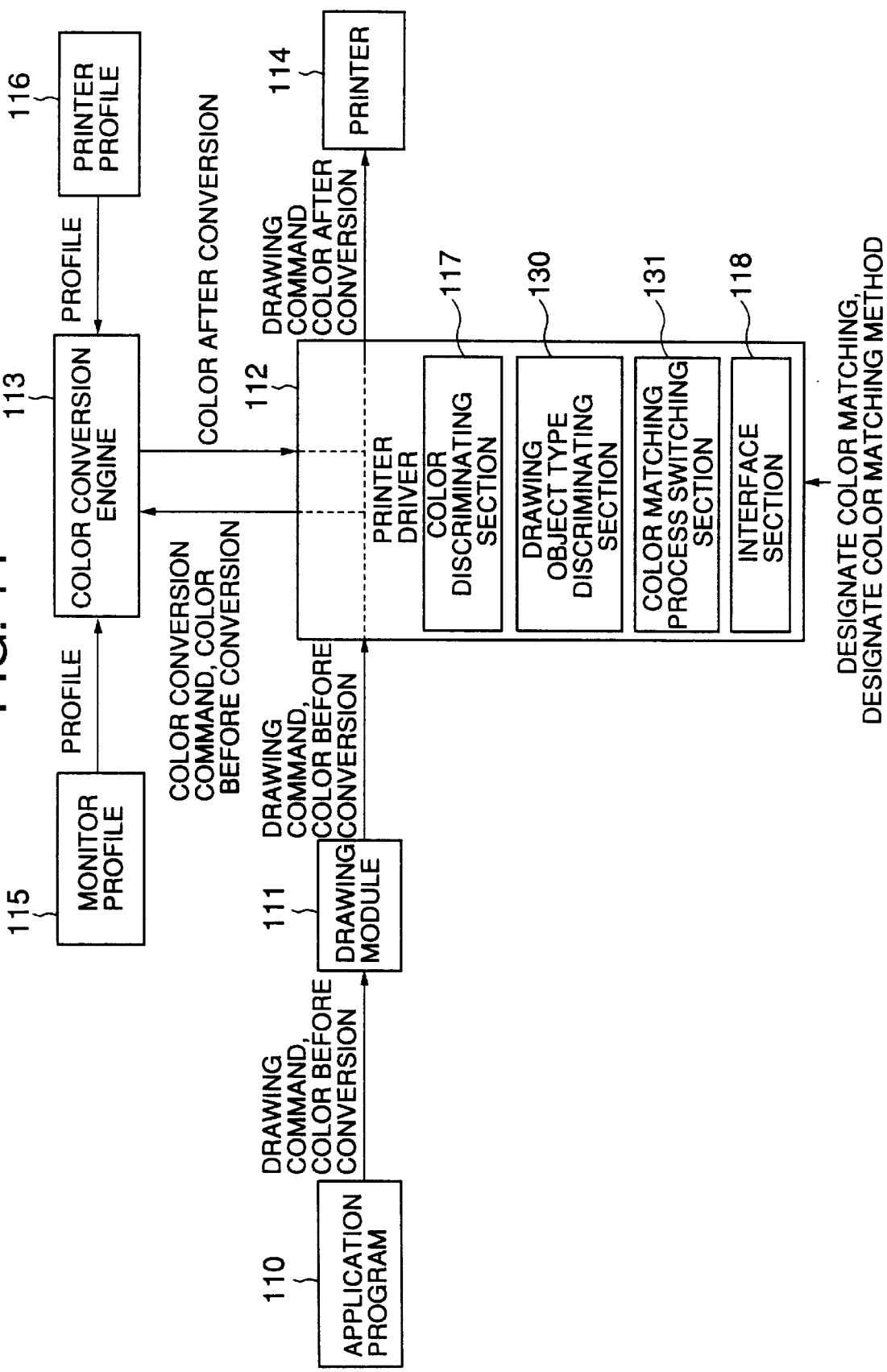
FIG. 14 is a block diagram of a color conversion processing system according to an eighth embodiment of the present invention.

A description will now be given of an eighth embodiment of the present invention. FIG. 14 is a block diagram of a color conversion processing system according to the eight embodiment of the present invention. The structure of the color conversion processing system according to the eighth embodiment is the same as the color conversion processing system shown in FIG. 12 except for the printer driver 112 being provided with a drawing object type discriminating section 130 and a color matching process switching section 131.

In the above-mentioned sixth and seventh embodiments, the color matching process is controlled by the printer driver 112. In the present embodiment, the printer driver 112 is provided with a further function to discriminate a type of drawing object so that the color matching process can be switched for each drawing object in addition to setting different colors for each drawing object.

As shown in FIG. 14, the printer driver 112 includes the drawing object type discriminating section 130 and the color matching process switching section 131. The printer driver 112 is adapted to designate types of drawing objects such as a bit map image, a character image or a graphic image. The drawing object type discriminating section 130 discriminates types of drawing objects based on the received drawing command. The color matching process switching section holds color conversion attribute information of the color matching process corresponding to the types of the drawing objects designated through the interface section 118 so as to produce a color conversion command which differs according to a type of each drawing object in accordance with the result of the determination of the drawing object type discriminating section 130.

In the color conversion processing method according to the eighth embodiment, discrimination of a type of drawing object and designation of a color matching process can be performed in the printer driver 112. Thus, setting of a different specific color for each object (second embodiment), switching of color matching process when a drawing object is the specific color and is not the specific color (third embodiment), setting of the specific color and setting of a color matching process (fourth embodiment) and execution of the specific color process when the drawing object is a character image (fifth embodiment) can be performed in the color conversion processing system according to the eighth embodiment of the present invention. It should be noted that the contents of the processes of these processes and the process of the eighth embodiment are substantially the same except that the setting is performed either through the application program or the printer driver, and a description thereof will be omitted. If the printer driver 112 cannot designate a color matching process for each drawing object, a color matching process for the specific color can be designated.

As mentioned above, according to the color conversion processing system and method according to the eight embodiment of the present invention, since discrimination of a type of drawing object and switching of a color matching process can be performed by the printer driver 112, the user can achieve an optimum color matching process for each drawing object. Thus, an occurrence of a matching error can be prevented for each drawing object even if one of the types of the drawing object includes a color which tends to generate the matching error.

It is assumed that there are profiles X and Y. The profile X is superior in accurately representing blue and red but is inferior in representing yellow and green, whereas the profile Y is inferior in accurately representing blue and red but is superior in accurately representing yellow and green. In this case, it is possible to create a single profile having advantages of both the profiles X and Y. However, according to the present invention, one of the profiles X and Y can be selected in accordance with a result of determination of the color discriminating section.

Figure 15:
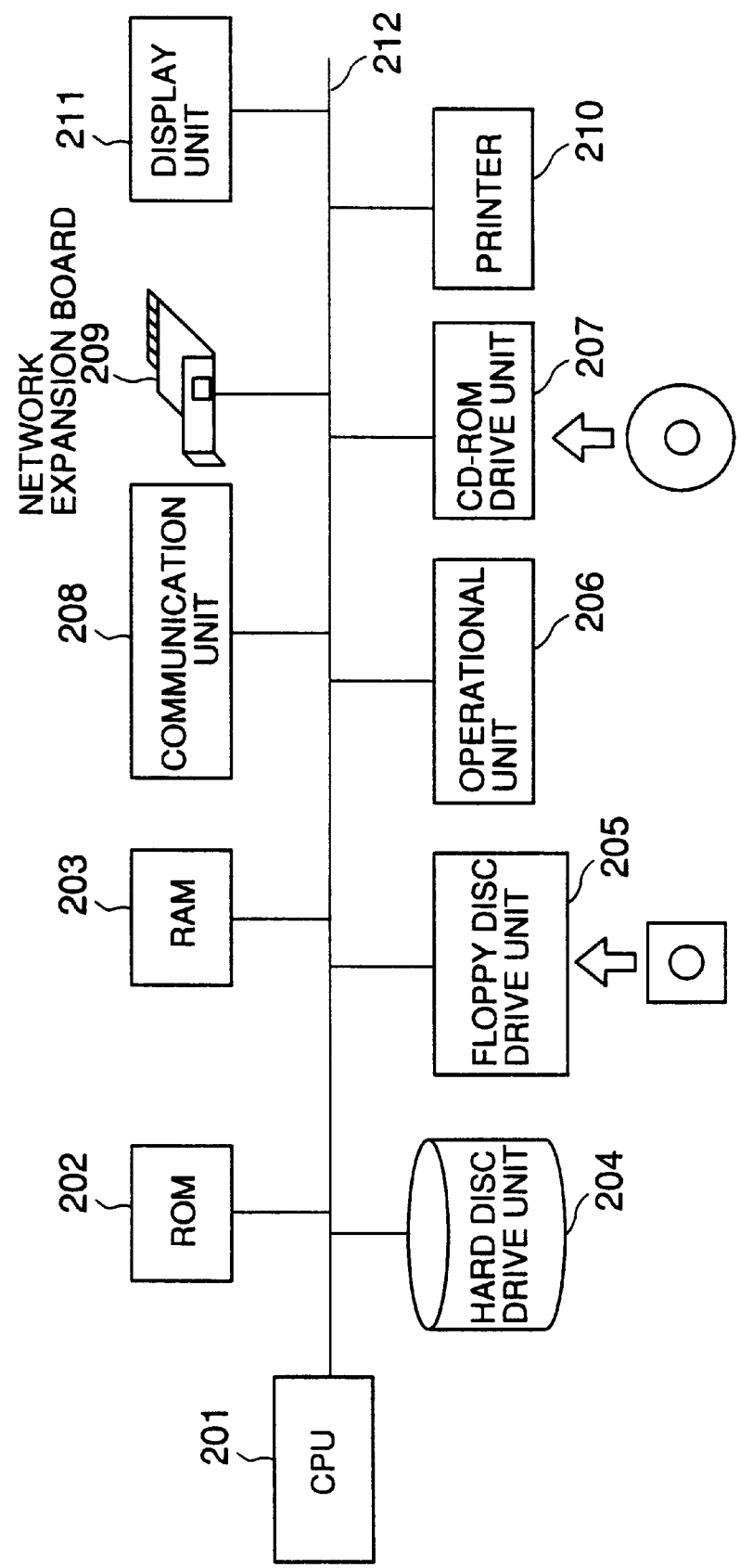
FIG. 15 is a system structure diagram of hardware of the color conversion processing systems according to the first to eighth embodiments of the present invention.

FIG. 15 is a system structure diagram of hardware which achieves the color conversion processing system according to the above-mentioned first to eighth embodiments. In FIG. 15, the color conversion processing system comprises a CPU 201, a ROM 202, a RAM 203, a hard disc drive unit 204, a floppy disc drive unit 205, an operational unit 206 such as a keyboard, a CD-ROM drive unit 207, a communication unit 208, a network expansion board 209, a printer 210 and a display unit 211. These units are interconnected by a bus line 212. The color image to be subjected to the color matching process is displayed on the display unit 211 such as a color monitor display, and is printed by the printer 210.

The color conversion processing system according to the first to eighth embodiments is achieved by software programs which are stored in the hard disc drive unit 204. The programs are read by the CPU 201 and temporarily stored in the RAM 203 when the color conversion processing system is operated. Additionally, the software program may be provided as program data recorded on a floppy disc which is read by the floppy disc drive unit 205, or recorded on a CD-ROM which is read by the CD-ROM drive unit 207.

That is, the color conversion processing method can be implemented by the computer readable programs, and the programs may be recorded on a computer readable recording medium such as a floppy disc, a hard disc, a CD-ROM or a DVD. The CPU 201 reads the programs by using the floppy disc drive unit 205 or the CD-ROM drive unit 207 so as to perform the above-mentioned process according to the present invention. Additionally, the CPU 201 can receive the programs via the communication unit 208 or the network expansion board 209.

The present invention is not limited to the specifically disclosed embodiments, and variations and modifications may be made without departing from the scope of the present invention.

What is claimed is:

1. A color conversion processing method for converting color image information including at least one drawing object to be drawn by a color image outputting apparatus so as to output the color image information after conversion to said color image outputting apparatus, said color conversion processing method comprising the steps of:

inputting the color image information;

determining whether each color of the drawing object in the input color image information is a previously designated specific color; and applying a previously designated color matching process to the color of the drawing object only when the color of the drawing object is not the specific color so that the color determined to be the specific color is not subjected to the color matching process.

2. The color conversion processing method as claimed in claim 1, wherein the determination of the determining step is performed for each type of the drawing object.

3. The color conversion processing method as claimed in claim 2, wherein said specific color is previously designated for each type of the drawing object.

4. The color conversion processing method as claimed in claim 1, further comprising the step of:

determining whether the drawing object in the color image information is a character image so that the determining step for color is performed only when the drawing object is the character image.

5. The color conversion processing method as claimed in claim 1, wherein said color image outputting apparatus is a color printer, and said specific color is one of colors of colorants used in said color printer.

6. The color conversion processing method as claimed in claim 1, wherein said specific color is selected from a group consisting of cyan, magenta, yellow, black, red, green, blue and white.

7. The color conversion processing method as claimed in claim 1, further comprising the step of:

designating an arbitrary color as said specific color in accordance with previously provided information.

8. The color conversion processing method as claimed in claim 7, wherein said designating step includes the step of designating an arbitrary color matching process to said color matching process in accordance with previously provided information.

9. The color conversion processing method as claimed in claim 7, wherein said designating step includes the step of designating an arbitrary color matching process for each drawing object included in said color image information.

10. A color conversion processing method for converting color image information including at least one drawing object to be drawn by a color image outputting apparatus so as to output the color image information after conversion to said color image outputting apparatus, said color conversion processing method comprising the steps of:

inputting the color image information;

determining whether each color of the drawing object in the input color image information is a previously designated specific color;

applying a previously designated color matching process to the color of the drawing object when the color of the drawing object is not the specific color; and applying a color matching process other than the previously designated color matching process to the color of the drawing object when the color of the drawing object is the specific color.

11. The color conversion processing method as claimed in claim 10, wherein the determination of the determining step is performed for each type of the drawing object.

12. The color conversion processing method as claimed in claim 11, wherein said specific color is previously designated for each type of the drawing object.

13. The color conversion processing method as claimed in claim 11, wherein a different color matching method is designated for each type of the object.

14. The color conversion processing method as claimed in claim 10, further comprising the step of:

determining whether the drawing object in the color image information is a character image so that the determining step for color is performed only when the drawing object is the character image.

15. The color conversion processing method as claimed in claim 10, wherein said color image outputting apparatus is a color printer, and said specific color is one of colors of colorants used in said color printer.

16. The color conversion processing method as claimed in claim 10, wherein said specific color is selected from a group consisting of cyan, magenta, yellow, black, red, green, blue and white.

17. The color conversion processing method as claimed in claim 10, further comprising the step of:

designating an arbitrary color as said specific color in accordance with previously provided information.

18. The color conversion processing method as claimed in claim 17, wherein said designating step includes the step of designating an arbitrary color matching process to said color matching method in accordance with previously provided information.

19. The color conversion processing method as claimed in claim 17, wherein said designating step includes the step of designating an arbitrary color matching method for each drawing object included in said color image information.

20. A processor readable medium storing program code causing a computer to perform a color conversion processing method for converting color image information including at least one drawing object to be drawn by a color image outputting apparatus so as to output the color image information after conversion to said color image outputting apparatus, said processor readable medium comprising:

program code means for inputting the color image information;

program code means for determining whether each color of the drawing object in the input color image information is a previously designated specific color; and program code means for applying a previously designated color matching process to the color of the drawing object only when the color of the drawing object is not the specific color so that the color determined to be the specific color is not subjected to the color matching process.

21. The processor readable medium as claimed in claim 20, wherein the determination of the program code means for determining is performed for each type of the drawing object.

22. The processor readable medium as claimed in claim 21, wherein said specific color is previously designated for each type of the drawing object.

23. The processor readable medium as claimed in claim 20, further comprising:

program code means for determining whether the drawing object in the color image information is a character image so that the determining step for color is performed only when the drawing object is the character image.

24. The processor readable medium as claimed in claim 20, wherein said color image outputting apparatus is a color printer, and said specific color is one of colors of colorants used in said color printer.

25. The processor readable medium as claimed in claim 20, wherein said specific color is selected from a group consisting of cyan, magenta, yellow, black, red, green, blue and white.

26. The processor readable medium as claimed in claim 20, further comprising:

program code means for designating an arbitrary color as said specific color in accordance with previously provided information.

27. The processor readable medium as claimed in claim 26, wherein said program code means for designating includes program code means for designating an arbitrary color matching process as said color matching process in accordance with previously provided information.

28. The processor readable medium as claimed in claim 26, wherein said program code means for designating includes program code means for designating an arbitrary color matching process for each drawing object included in said color image information.

29. A processor readable medium storing program code causing a computer to perform a color conversion processing method for converting color image information including at least one drawing object to be drawn by a color image outputting apparatus so as to output the color image information after conversion to said color image outputting apparatus, said processor readable medium comprising:

program code means for inputting the color image information;

program code means for determining whether each color of the drawing object in the input color image information is a previously designated specific color;

program code means for applying a previously designated color matching process to the color of the drawing object when the color of the drawing object is not the specific color; and program code means for applying a color matching process other than the previously designated color matching process to the color of the drawing object when the color of the drawing object is the specific color.

30. The processor readable medium as claimed in claim 29, wherein the determination of the program code means for determining is performed for each type of the drawing object.

31. The processor readable medium as claimed in claim 30, wherein said specific color is previously designated for each type of the drawing object.

32. The processor readable medium as claimed in claim 30, wherein a different color matching method is designated for each type of the object.

33. The processor readable medium as claimed in claim 29, further comprising:

program code means for determining whether the drawing object in the color image information is a character image so that the determining for the color of the drawing object is performed only when the drawing object is the character image.

34. The processor readable medium as claimed in claim 29, wherein said color image outputting apparatus is a color printer, and said specific color is one of colors of colorants used in said color printer.

35. The processor readable medium as claimed in claim 29, wherein said specific color is selected from a group consisting of cyan, magenta, yellow, black, red, green, blue and white.

36. The processor readable medium as claimed in claim 29, further comprising:

program code means for designating an arbitrary color as said specific color in accordance with previously provided information.

37. The processor readable medium as claimed in claim 36, wherein said program code means for designating includes program code means for designating an arbitrary color matching process to said color matching process in accordance with previously provided information.

38. The processor readable medium as claimed in claim 36, wherein said program code means for designating includes program code means for designating an arbitrary color matching process for each drawing object included in said color image information.

* * * * *